(12) United States Patent
Ruttenberg

(10) Patent No.: US 11,154,875 B2
(45) Date of Patent: Oct. 26, 2021

(54) PULSATING DEVICE WITH TWO PRESET PRESSURE-RESPONDING NORMALLY CLOSED VALVES

(71) Applicant: Pulsating Irrigation Products, Inc., Temecula, CA (US)

(72) Inventor: Gideon Ruttenberg, Petach Tikva (IL)

(73) Assignee: Pulsating Irrigation Products, Inc., Temecula, CA (US)

( * ) Notice: Subject to any disclaimer, the term of this patent is extended or adjusted under 35 U.S.C. 154(b) by 113 days.

(21) Appl. No.: 14/440,313

(22) PCT Filed: Nov. 4, 2013

(86) PCT No.: PCT/IB2013/059890
§ 371 (c)(1),
(2) Date: May 1, 2015

(87) PCT Pub. No.: WO2014/068536
PCT Pub. Date: May 8, 2014

(65) Prior Publication Data
US 2015/0314307 A1    Nov. 5, 2015

Related U.S. Application Data

(60) Provisional application No. 61/722,108, filed on Nov. 2, 2012.

(51) Int. Cl.
*B05B 1/08* (2006.01)
*A01G 25/02* (2006.01)
*B05B 1/30* (2006.01)

(52) U.S. Cl.
CPC ............... *B05B 1/08* (2013.01); *A01G 25/02* (2013.01); *B05B 1/086* (2013.01); *B05B 1/3006* (2013.01);
(Continued)

(58) Field of Classification Search
CPC ......... B05B 1/08; B05B 1/3006; B05B 1/086; A01G 25/02; Y10T 137/0379; Y10T 137/86485
(Continued)

(56) References Cited

U.S. PATENT DOCUMENTS 3,298,391 A * 1/1967 Savage ................. F16K 17/19
                                                    137/493
3,797,741 A    3/1974 Spencer
(Continued)

OTHER PUBLICATIONS

EP 09768240.5 filed May 31, 2011 Exam Report dated Aug. 8, 2014.
PCT/IB2013/059890 filed Nov. 4, 2013 International Search Report and Written Opinion dated Apr. 8, 2014.

*Primary Examiner* — Qingzhang Zhou
(74) *Attorney, Agent, or Firm* — Patterson + Sheridan, LLP

(57) ABSTRACT

A pulsating device with two preset pressure-responding normally-closed valves is disclosed. The first valve is used for accumulating fluid. The second valve is used for creating resistance so as to force the first valve to open widely. The second valve may be configured so it creates little to no resistance once opened. In some embodiments, the pulsating device converts a low controlled and/or continuous flow of fluid, such as water and/or air, to a high pulsating and/or intermittent flow. A pulsating device may operate, for example, one or more drip lines, pop ups, sprinklers, misters and/or other irrigation devices.

20 Claims, 7 Drawing Sheets

(52) U.S. Cl.
CPC .. *Y10T 137/0379* (2015.04); *Y10T 137/86485* (2015.04)

(58) Field of Classification Search
USPC .................... 239/1, 99, 204, 412, 416.5
See application file for complete search history.

(56) References Cited

U.S. PATENT DOCUMENTS

| | | |
|---|---|---|
| 4,077,570 A | 3/1978 | Harmony |
| 4,938,420 A | 7/1990 | Ruttenberg |
| 5,314,116 A | 5/1994 | Krauth et al. |
| 5,353,993 A | 10/1994 | Rosenberg |
| 5,507,436 A * | 4/1996 | Ruttenberg ............ B05B 1/086 239/1 |
| 5,531,381 A | 7/1996 | Ruttenberg |
| 5,601,381 A | 2/1997 | Hadar et al. |
| 5,727,733 A | 3/1998 | Ruttenberg |
| 8,794,539 B2 | 8/2014 | Ruttenberg |
| 2002/0088877 A1 | 7/2002 | Bertolotti et al. |
| 2003/0029929 A1 | 2/2003 | Rosenberg |
| 2007/0282264 A1 | 12/2007 | Shekalim |
| 2009/0032614 A1 | 2/2009 | Ruttenberg |

* cited by examiner

PULSATING DEVICE WITH TWO PRESET PRESSURE-RESPONDING NORMALLY CLOSED VALVES

RELATED APPLICATION

This application claims the benefit of priority under 35 USC § 119(e) of U.S. Provisional Patent Application No. 61/722,108 filed Nov. 2, 2012, the contents of which are incorporated herein by reference in their entirety.

FIELD AND BACKGROUND OF THE INVENTION

The present invention, in some embodiments thereof, relates to a pulsating device and, more particularly, but not exclusively, to a pulsating device that converts a low-rate, continuous controlled flow of fluid into a higher-rate pulsating or intermittent flow.

U.S. Pat. No. 5,507,436 to the present inventor discloses a device and method for converting pressurized low continuous liquid flow to pressurized high intermittent pulsating flow. It employs a pressurized hydraulic transformer (PHT) which is useful in any application in which low continuous fluid flow can be converted to pulsating higher flows in a continuous repetitive manner. In some embodiments, a small size tube, or other means, creates a resistance to the flow or back pressure on the valve. This forces the valve, when it opens due to pressure, to become widely open and allow the liquid to flow at a relatively high rate from the container through the valve and the resistance.

U.S. Pat. No. 5,727,733 to the present inventor discloses pulsating devices which are used for converting a low continuous flow to a high intermittent pulsating flow. The pulsating device consists of an insert, an elastic tube and a casing that is without venting perforations at its outer periphery. The casing surrounds the elastic tube and forms a space between the inner surface of the rigid casing and the outer surface of the elastic tube. By using a casing which has a large space relative to the change in volume of the elastic tube, expansion of the elastic tube can be done without providing venting perforations in the casing.

U.S. Patent Application Publication No. 2010/061375 (which is incorporated herein in its entirety) to the present inventor discloses an apparatus for operating a group of normally closed, pressure compensated drippers at relatively low liquid flow rates, comprising a pulsating device having an inlet and an outlet that converts a low continuous liquid flow rate entering its inlet, through a flow control unit, to a high intermittent and pulsating flow rate ejected through its outlet, a manifold having an inlet connected to the outlet of the pulsating device, a group of normally-closed, pressure-compensated drippers (101) connected to the manifold (102).

Additional background art includes U.S. Pat. No. 7,900,851 to the present inventor, U.S. Pat. No. 3,902,664 to Deines, U.S. Pat. No. 5,314,116 to Brunnengraeber et al., U.S. Pat. No. 4,909,441 to Christy.

SUMMARY OF THE INVENTION

According to an aspect of some embodiments of the present invention there is provided a pulsating device including an expandable collection chamber receiving fluid from a fluid inlet; a burst chamber in a first fluid communication with the expandable collection chamber; a first normally closed valve that controls the first fluid communication between the expandable collection chamber and the burst chamber; and a second normally closed valve that controls a second fluid communication between the burst chamber and a fluid outlet. The first valve opens relatively narrowly when a collection chamber pressure in the collection chamber exceeds a first pressure value. The second valve creates a resistance, forcing the first valve to open relatively widely. The second valve opens when a burst pressure at a location of the second valve exceeds a second pressure value.

According to some embodiments of the invention, the pulsating device further comprises a rigid insert and an elastic sleeve surrounding the rigid insert. The expandable collection chamber is comprised between the elastic sleeve and the rigid insert, along at least a part of the length of the rigid insert up to the first valve. The burst chamber is comprised between the elastic sleeve and the rigid insert, along at least a part of the length of the rigid insert beyond the first valve.

According to some embodiments of the invention, the first valve comprises an annular protrusion on the rigid insert.

According to some embodiments of the invention, the second valve comprises a port in the rigid insert covered by the elastic sleeve.

According to some embodiments of the invention, an outer diameter of the rigid insert at a location of the port is greater than an inner diameter of the elastic sleeve in an unstressed state.

According to some embodiments of the invention, the pressure in the collection chamber increases at a first rate in response to an increasing volume of fluid in the collection chamber and the pressure in the burst chamber increases at a second rate in response to an increasing volume of fluid in the burst chamber, the second rate being greater than the first rate.

According to some embodiments of the invention, the first pressure value is greater than the second pressure value.

According to some embodiments of the invention, an inner diameter of the fluid inlet is less than an inner diameter of the fluid outlet.

According to some embodiments of the invention, a length of the collection chamber is greater than a length of the burst chamber.

According to some embodiments of the invention, the second valve closes when the burst pressure at a location of the second valve is less than the second pressure value.

According to some embodiments of the invention, the pulsating device further includes at least one output device in fluid communication with the outlet, the output device selected from the group consisting of a micro sprinkler, a micro-jet, an agricultural dripper, a pop up sprinkler, micro-spinners, a mister, a fogger, an anti-frost system or other irrigation or spraying devices.

According to an aspect of some embodiments of the present invention there is provided a method of producing a pulsating flow employing a pulsating device having an expandable collection chamber, a first valve, a burst chamber, a second valve and a fluid outlet. The method includes increasing a volume of a collected fluid in the collection chamber to raise a collection chamber pressure in the collection chamber; opening the first valve narrowly to allow the collected fluid to flow from the collection chamber into the burst chamber when the collection chamber pressure has reached at least a first pressure value; widening the opening of the first valve in response to resistance created by the second valve; and opening the second valve when the burst pressure has reached at least a second pressure value thereby allowing at least a portion of the collected fluid to exit the fluid outlet. According to some embodiments of the invention, the collection chamber pressure increases at a first rate relative to the increasing of the collected fluid volume and the burst pressure increases at a second rate relative to the accumulating, and wherein the second rate is greater than the first rate.

According to some embodiments of the invention, the method further includes lowering the collection chamber pressure at the first rate relative to a reduction of a volume of the collected fluid; lowering the burst pressure at the second rate relative to the reducing a volume of the burst chamber fluid; closing the first valve when the pressure in the collection chamber is reduced below the first pressure value; and closing the second valve when the pressure at the second valve is reduced below the second pressure value.

According to some embodiments of the invention, the widening occurs prior to the opening of the second valve.

According to some embodiments of the invention, the pressure required to open the second valve is greater than a combined flow resistance of the burst chamber and the second valve and the fluid outlet.

According to some embodiments of the invention, a fluid (such as water) flows into the inlet at flow rate of less than 2 l/hr.

According to some embodiments of the invention, the opening of the second valve comprises expanding of an elastic sleeve away from a valve port.

According to some embodiments of the invention, the method further includes directing at least a portion of the collected fluid that exits the pulsating device to at least one application selected from the group consisting of a micro sprinkler, a micro-jet, an agricultural dripper, a pop up sprinkler, micro-spinners, a mister, a fogger, an anti-frost system, or other irrigation or spraying devices.

According to some embodiments of another aspect of the invention, there is provided an irrigation system, comprising a source of pressurized liquid, an output device for discharging fluid intermittently therefrom, and a pulsating device of the nature described herein connected between the source and the output device.

Exemplary methods and/or materials are described herein, but one of ordinary skill in the art would understand that methods and materials similar or equivalent to those described herein can also be used in the practice of the invention.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
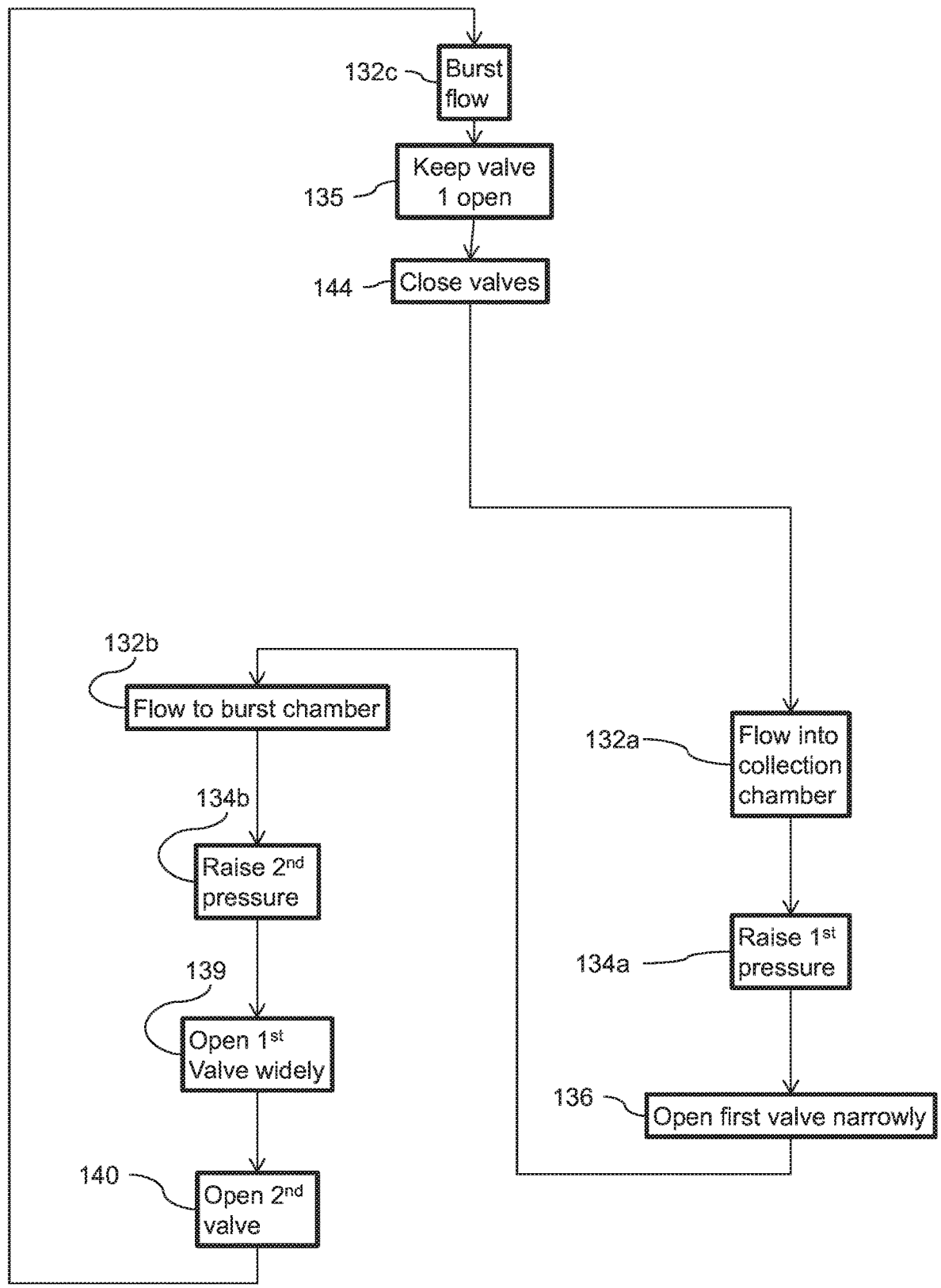
FIG. 1 is a flowchart showing steps converting a low controlled continuous flow to a high pulsating or intermittent flow in accordance with an embodiment of the present invention.

The present invention, in some embodiments thereof, relates to a flow pulsating device and, more particularly, but not exclusively, to a pulsating device that converts a low controlled flow of fluid to a higher pulsating or intermittent flow.

Overview

1 Pressure-Responding Burst Chamber Valve

In some embodiments a pulsating device may have two pre-set normally-closed valves in which the second normally-closed valve is used for forcing the main normally-closed valve to open widely. When the main (first) normally-closed valve opens, fluid flows through the main valve, but the second normally closed valve prevents the fluid from exiting the pulsating device. As a result, a chamber holding the fluid expands and the first valve becomes open widely, so that the first valve no longer generates significant resistance. The second valve is structured so that, when open, it generates little to no hydraulic resistance. When both valves are open, fluid is ejected through the outlet of the pulsating device at a minimum friction loss. Such pulsating devices can be used for operating an output device such as drip lines, pop-up sprinklers and sprayers and other irrigation devices in pulses. Such pulsating devices can also be, for example, hung upside down and operate with a fogger or a mister (among other emitters) at a very low flow such as one liter per hour.

In some embodiments, the first valve may open minimally or relatively narrowly in response to a pressure in the collection chamber reaching a first predetermined value. Opening the first valve narrowly may allow fluid from the collection chamber to enter the burst chamber. Optionally as fluid begins to enter the burst chamber, the second valve is closed creating a resistance preventing fluid from passing to the outlet of the burst chamber. The resistance may force the first valve to open widely. For example the resistance may cause the collection chamber, the burst chamber and/or both the collection and the burst chambers to expand in response to entering fluid. This can occur, for example, when an elastic sleeve expands relative to a rigid insert. Once the first valve opens widely the two chambers may optionally become one chamber. In response to an increasing pressure at the location of the second valve, the second valve opens and allows the fluid to pass to the outlet. In some embodiments, the second valve opens as a result of an increasing volume of fluid in both the expanded collection chamber and the expanded burst chamber, creating sufficient pressure to open the second valve.

In some embodiments, the first valve generates resistance in the manner described in U.S. patent No. U.S. Pat. No. 5,507,436 (incorporated herein by reference) to the same inventor for the purpose of collecting fluid in the collection chamber. In such embodiments, the second chamber, by contrast, may provide significant resistance when the second valve is in the normally closed position, so as to force the chamber to expand further and/or force the first valve to become open widely. Once this is accomplished, the second valve may open offering little to no significant resistance. For example, the fluid may flow out the outlet with minimal friction loss.

In some embodiments, the pulsating device may include (or further include) a rigid insert and an elastic sleeve surrounding the rigid insert. The elastic collection chamber may be formed in a space between the rigid insert and a first section of the elastic sleeve. Optionally, the burst chamber may be formed in a space between the elastic sleeve and a second section of the rigid insert. For example, the first valve may be formed by an annular protrusion of the rigid insert located between the first section and the second section. An outer diameter of the protrusion may be greater than an unstressed inner diameter of the elastic sleeve.

In some embodiments of the invention, the second valve comprises a port or hole in the rigid insert (for example at some point downstream from the first valve) covered by the elastic sleeve, which second valve opens once the elastic sleeve opens over the port or hole. In some embodiments, an outer diameter of the rigid insert at a location of the port or hole is greater than an inner diameter of the elastic sleeve in an unstressed state.

In some embodiments, the burst chamber may not exist as a separate chamber and may only be comprised once fluid passes through the first valve. In such embodiments, an elastic sleeve may surround a rigid insert. The burst chamber may be comprised between the elastic sleeve and rigid insert at some point downstream from the first valve. In such an embodiment, the burst chamber may have no volume and/or a de minimus volume when the pulsating device is non-operational, before fluid passes through the collection chamber, and/or fluid is released from the burst chamber and the first valve remains closed.

Similarly, in some embodiments, the collection chamber may have no volume and/or a de minimus volume when the pulsating device is non-operational and/or when fluid is not flowing through the inlet of the pulsating device to the collection chamber. In such embodiments, an elastic sleeve may surround a rigid insert, and the collection chamber may be comprised between the elastic sleeve and rigid insert at some point upstream from the first valve. When the elastic sleeve is in the contracted position and no fluid is flowing into the pulsating device, the collection chamber may have no volume and/or de minimus volume.

In some embodiments, the second valve may comprise a port or hole in the rigid insert covered by an elastic sleeve. The port or hole may also comprise an outlet port in communication with a fluid outlet and passing the fluid to an outlet device. Optionally, the second valve may be formed by the sleeve wrapped around the outlet port. For example, the outer diameter of the rigid insert at the location of the outlet port may be larger than the unstressed inner diameter of the sleeve. When the sleeve is wrapped around the outlet port in may be stretched against the outlet port, biasing the outlet port closed. The outlet port and sleeve may optionally form a normally-closed valve. The valve is normally closed when there is no external stress expanding the elastic sleeve to an open position.

Pressure in the burst chamber may optionally be highly sensitive to accumulated fluid volume in the burst chamber. For example, fluid flowing into the closed burst chamber may cause a large rise in pressure in the burst chamber. The increased pressure in the burst chamber may open the first valve widely and/or keep the first valve open. The increased pressure may open the second valve allowing a fluid pulse to be discharged from the pulsating device. The fluid pulse may include fluid from the collection chamber and/or the burst chamber.

In some embodiments, the collection chamber may have a relatively large fluid capacity and/or the pressure in the collection chamber may rise with increasing fluid volume in the collection chamber at a low rate. Optionally, the burst chamber may have a relatively smaller fluid capacity and/or the pressure in the collection chamber may increase with increasing fluid volume at a second rate that is higher than the first rate.

In some embodiments, the outlet port may be wider than the inlet and/or an inlet passageway and/or an inlet port.

In some embodiments, the length of the burst chamber (or the length along the rigid insert downstream from the first valve) may be significantly shorter than the length of the collection chamber (or the length along the rigid insert up to the first valve). In some embodiments, the distance from the first (inter chamber) valve to the second (outlet) valve and/or outlet port may be much less than the distance from the inter chamber valve to the inlet port. In some embodiments, the potential volume of the expandable collection chamber is significantly greater than the potential volume of the expandable burst chamber.

2 Low Resistance Pulsating Device

An aspect of some embodiments of the present invention relates to a pulsating device with reduced resistance to flow. In some embodiments, during a burst of fluid discharge, outlet valve may be open and there may be very low resistance to flow in the outlet.

In some embodiments, communication between burst chamber and the outlet may be, for example, via an outlet passageway and/or an outlet port configured to have low fluid resistance. For example, the outlet, outlet passageway and/or outlet port may be wider than the inlet and/or an inlet passageway and/or an inlet port.

Exemplary Embodiments

1 Method for Producing a Pulsating Flow From a Low Rate Controlled Flow

Referring now to the drawings, FIG. 1 is a flowchart illustrating a method of producing a higher-rate pulsating flow or intermittent from a low rate, continuous controlled flow according to an embodiment of the present invention. In the method two valves are opened sequentially to release a burst of fluid from two interconnected chambers.

In some embodiments, fluid may flow into the collection chamber at a relatively low controlled, flow rate. For example, before any fluid flows into the pulsating device, both chambers (the collection chamber and the burst chamber) may be empty, and/or both chambers may contain a small residual quantity of fluid. In this initial state, both valves (a first, inter-chamber valve and a second outlet valve) are in their normally closed state. The pulsating device in this embodiment begins to operate when fluid begins to flow into the pulsating device at a relatively low controlled flow rate. In this embodiment, fluid flows 132*a* into an expandable collection chamber at a low controlled rate. With the inter chamber valve in its normally closed state, fluid collects in the expandable collection chamber, which expands. As fluid collects, the pressure in the expandable collection chamber rises 134*a*. Optionally, the fluid collection chamber may be relatively large and/or the rate of pressure increase relative to collected fluid volume may be relatively small. The expandable collection chamber slowly accumulates fluid and pressure rises 134*a* gradually as the elastic portion of the chamber is stretched. In some embodiments, the memory properties of the elastic material's desiring to return to its unstressed position contribute to the increasing pressure as in-flowing fluid expands the chamber. When pressure in the expandable collection chamber reaches a predetermined first valve opening level, the first (inter-chamber) normally closed, pressure-responding valve opens narrowly 136 allowing fluid to flow 132*b* from the collection chamber to a burst chamber.

In some embodiments, the expandable burst chamber may optionally have a relatively small potential volume for storage capacity. In some embodiments, with the outlet valve closed for a given volume of fluid input, the pressure in the expandable burst chamber increases 134*b* relatively quickly. In some embodiments, the rate of increase is affected by the memory properties of the elastic material. With the outlet (second) valve in its normally closed position, resistance to flow of fluid flowing from the expandable collection chamber contributes to the opening widely 139 of the inter chamber valve. With the inter chamber valve opened widely, the two chambers may optionally merge into a single enlarged chamber. The rapid rise 134*b* of pressure at the location of the second valve may optionally rapidly open 140 a second valve (the outlet valve), releasing (for example as illustrated in FIG. 1D) a burst flow 132*c* of fluid from the pulsating device. For example, the second valve may open when pressure in the outlet chamber reaches a predetermined second valve opening level. In some embodiments, the second (outlet) valve is structured to minimize or eliminate resistance through the value once its opens. For example, the second (outlet) valve may comprise an elastic tube over a port or hole in a rigid insert downstream from the first valve.

In some embodiments, as the burst flow 132*c* is released, the pressures of the collection chamber and/or the burst chamber may optionally keep 135 the inter chamber valve open. The first and/or second valves may close 144 for example when pressure at the first and/or second valve, respectively falls below a predetermined pressure value required to maintain the opening. Optionally, once both valves have closed 144 after fluid has been ejected from the pulsating device, thereby completing a pulse cycle, the next cycle can begin. However, it should be noted that both valves need not close in sync with one another, such that one pulse cycle as determined by the opening and closing of the second valve need not correspond to a fixed number of openings and closings for the first valve.

2 Exemplary Pulsating Device

Figure 2:
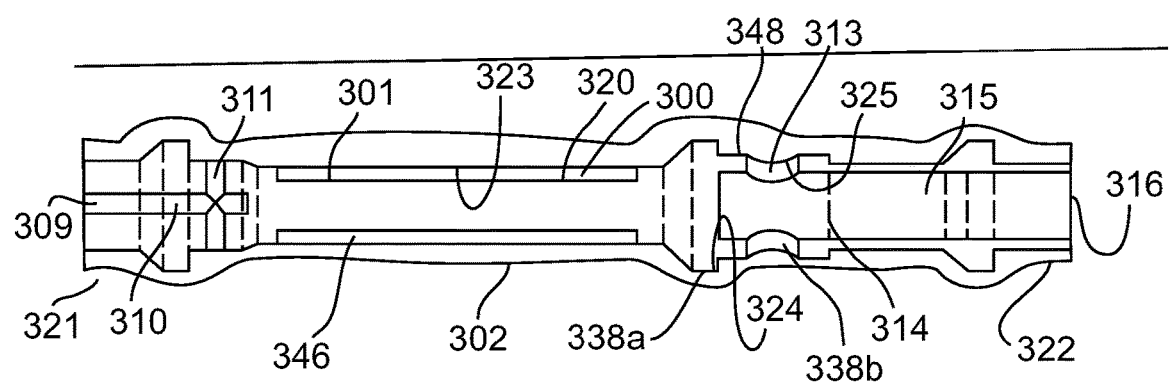
FIG. 2 illustrates an insert covered by an elastic sleeve, in a cross-section of a pulsating device, which includes two preset pressure-responding normally-closed valves, in accordance with an embodiment of the present invention.

FIG. 2 illustrates a pulsating device 300 including an insert 301 surrounded by an elastic sleeve 302 according to an exemplary embodiment of the present invention. Sleeve 302 is optionally sealed to insert 301 at an inlet end 321 and an outlet end 322. A fluid pathway exists through pulsating device 300 as follows: fluid may enter an inlet 309 in insert 301. From inlet 309 fluid may pass through an inlet passage 310 and a port 311 into a collection chamber 346 formed between an outside surface 320 of the insert 301 and inside surface 323 of the elastic sleeve 302. Fluid may exit collection chamber 346 through an inter chamber valve 338*a* to an outlet chamber 348 (for example, see FIG. 4B). Outlet chamber 348 is formed between an outside surface of insert 301 at outlet valve 338*b* and inside surface 325 of elastic sleeve 302. Fluid may pass from outlet chamber 348 through outlet port 313 to an outlet passage 315 and exit a fluid outlet 316. Optionally, the outer diameter 314 of insert 301 at the location of outlet port 313 is greater than the unstressed inner diameter of sleeve 302. For example, when sleeve 302 is stretched over outlet port 313 it forms a normally biased closed outlet valve 338*b*.

3 Pulsating Device Tube Insert

Figure 3:
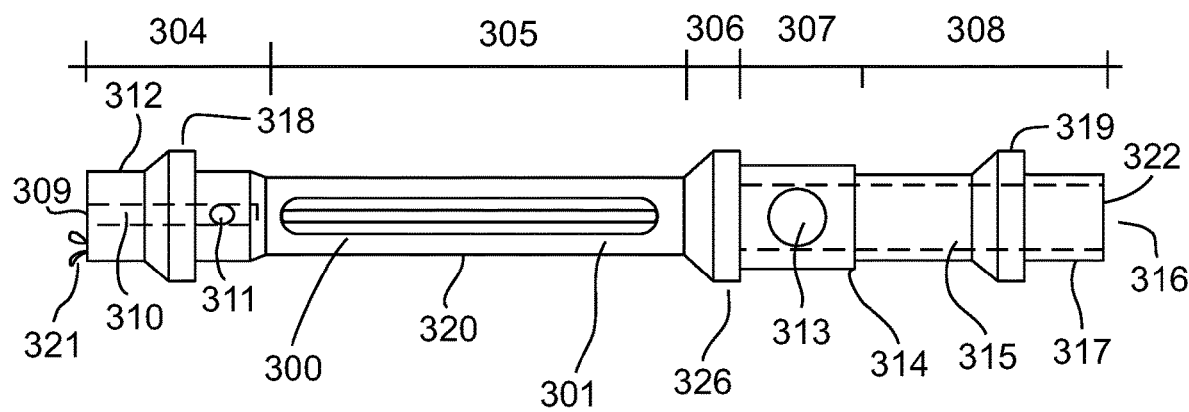
FIG. 3 illustrates a cross section of an insert of a pulsating device in accordance with an embodiment of the present invention.

FIG. 3 is a cross-section view of exemplary insert 301. Insert 301 includes five sections as follows: an inlet section 304, a collection chamber section 305, an inter chamber valve section 306, a burst chamber section 307, and an outlet section 308.

Inlet section 304 includes for example inlet 309, inlet passage 310 and port 311. Port 311 is in fluid communication with inlet 309 via inlet passage 310. Inlet section 304 also includes a straight section 312 and barb 318.

Collection chamber section 305 connects inlet section 304 with inter chamber valve section 306. At collection chamber section 305, insert 301 has an outside diameter.

Burst chamber section 307 includes an outlet port 313 connecting burst chamber 348 to outlet passage 315 and outlet 316. At burst chamber section 307, insert 301 has an outside diameter 314. Optionally, outside diameter 314 at burst chamber section 307 is at least as large and/or larger than outside diameter at collection chamber section 305.

Outlet section 308 includes outlet passage 315 and outlet 316. Outlet 316 is in fluid communication with port 313. In embodiment 300 the inner diameter of burst chamber port 313, outlet passage 315 and outlet 316 are as large as and/or larger than the inner diameter of inlet 309, inlet passage 310 and/or collection chamber port 311. In some embodiments, this may lower resistance at outlet 316. In some embodiments, outlet section 308 also includes a straight section 317 and barb 319.

Insert 301 may optionally be composed of a rigid material such as various types of plastic or polymer materials, such as ABS, polypropylene, or acetal. Other rigid water-proof materials are also well within the scope of the invention. Insert 301 can be produced or manufactured as a single part, or it can be comprised from multiple parts. For example, collection chamber section 5 can be a separate pipe, with inlet section 304 produced as separate part connected to one side of the pipe, and sections 306, 307 and 308 collectively produced also as one part connected to the other side of the pipe. Alternatively, sections 304, 305, 306, 307 and 308 can also be produced as a single rigid part.

Referring back to FIG. 2 and FIG. 3, in exemplary embodiment 300, one side of elastic sleeve 302 surrounds and is in contact with straight section 312 of inlet section 304 of insert 301. The outlet end 322 of the elastic sleeve 302 surrounds and is in contact with straight section 317 of outlet section 308 of insert 301. Barb 318 at inlet section 304 and barb 319 at outlet section 308 optionally hold elastic sleeve 302 fixed around insert 301. Inter chamber valve 338*a* is formed for example by an inside surface 324 of the elastic sleeve 302 pressing on an annular protrusion around insert 301 (for example the annular protrusion may have the form of a barb 326 [FIG. 3]). Inter chamber valve 338*a* may be normally closed (for example, the unstressed inner diameter of sleeve 302 may be smaller than the outer diameter of barb 326). Inter chamber valve 338*a* may open in response to a pressure in collection chamber 346 and/or burst chamber 348 exceeding a predetermined threshold.

Outlet valve 338*b* may optionally be normally closed. Outlet valve 338*b* may open when pressure in burst chamber 348 or at the second valve exceeds a predetermined threshold. In some embodiments, among other things, the diameter of barb 326, the inside diameter of sleeve 302, the length of collection chamber section 305 and the properties (for example the elasticity) of the sleeve 302 can be used to control the ejected volume of fluid that flows out from embodiment 300 in each pulse.

4 Pulsating Device with Casing in Different Stages of a Pulse

Figure 4A:
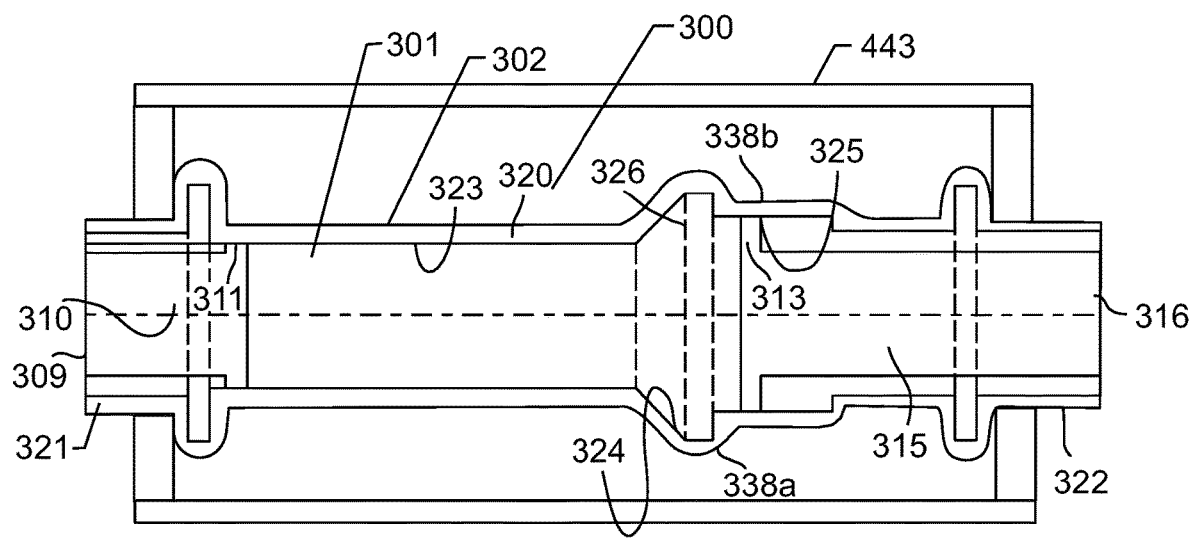
FIG. 4A-C illustrate, cross-section views of an insert of a pulsating device, an elastic sleeve and a casing in collecting, switching and releasing modes respectively, in accordance with an embodiment of the present invention.
Figure 4B:
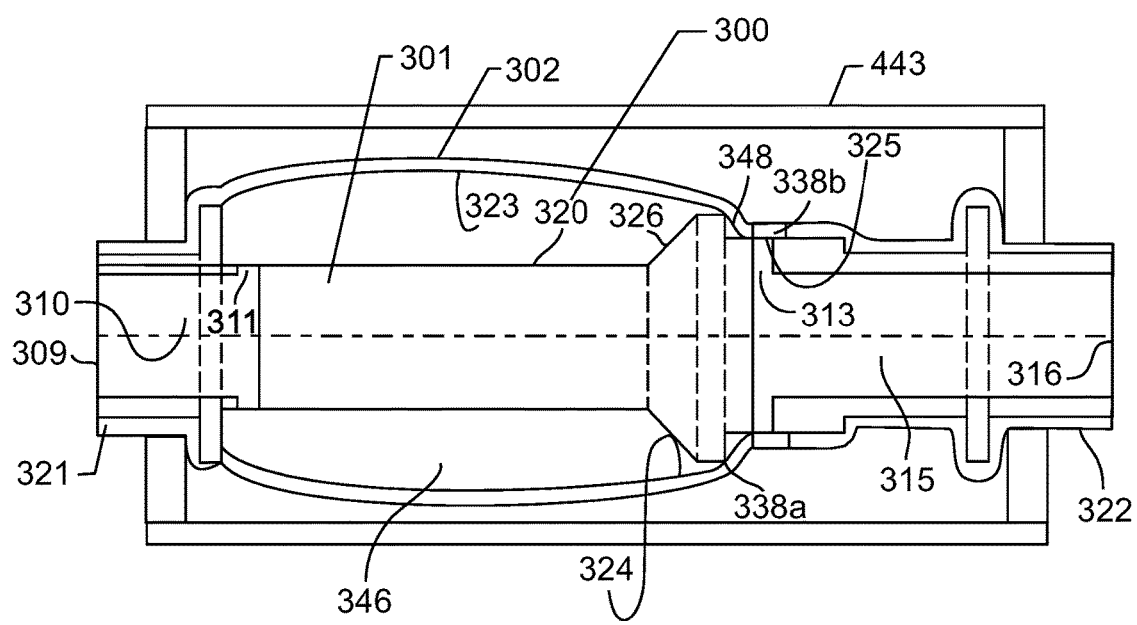
Figure 4C:
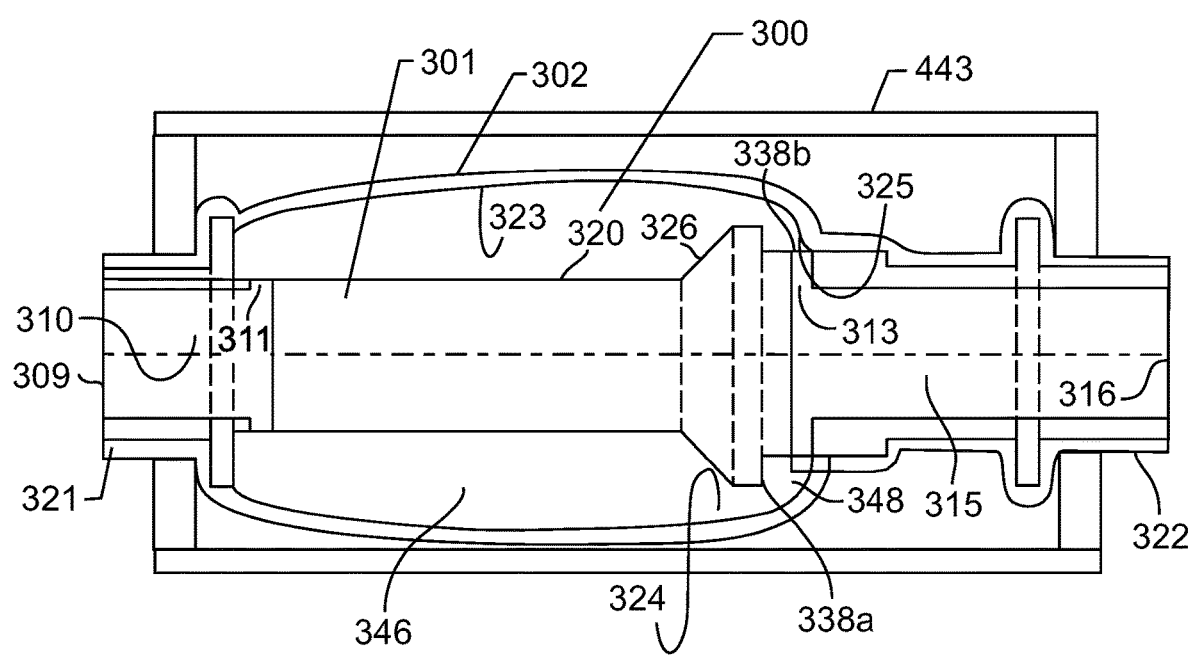

FIGS. 4A-C illustrate embodiment 300 illustrated with an optional casing 443. In some embodiments, casing 443 may protect elastic sleeve 302 and/or inset 301 from physical damage, including damage caused by weather, heat and/or insects. Casing 443 may be made from plastic or polymer materials, such as ABS, polypropylene, or acetal. Other rigid water-proof materials are also well within the scope of the invention. UV-resistant material can also be applied or included in the material composition to protect it during long exposure to sunlight in the field.

In some embodiments, casing 443 is used to prevent elastic sleeve 302 from over expanding or expanding without control. Over time, elastic materials such as silicon lose the ability to retain their shape and properties if stretched excessively toward the maximum or toward a certain percentage of the maximum expansion. In some embodiments, casing 443 blocks the elastic sleeve from expanding beyond the point desired for maintain the elastic material's properties.

In some embodiments, casing 443 attaches directly on a portion of insert 301 that is not covered by the elastic sleeve 302. In other embodiments, casing 443 can attach to insert 301 and/or elastic sleeve 302 by way of a fitting. For example, casing 443 can attach to insert 301 through various manners such as a latch, application of adhesive materials, ultrasonic welding, or a bolt, or by fastening the casing 443 to insert 301 by screwing on an output (spraying) device such as a strip jet.

In some embodiments and for certain applications, elastic sleeve 302 can be a molded part. Alternative or additionally, elastic sleeve 302 may comprise a short section of elastic tube. Elastic sleeve 302 may optionally be produced from one or more different types of elastic material, such as silicone rubber, EPDM rubber, etc. In some embodiments, such as when the elastic sleeve is made of EPDM or other rubbers, the elastic sleeve may also be cemented to the plastic insert at one and/or both of its ends, such that the elastic sleeve can be held at a fixed location without using any fittings. Such an elastic sleeve may optionally be held at a fixed location without fittings.

FIG. 4A illustrates, in a cross-section, embodiment 300 before fluid has entered the pulsating device. Once the pulsating device is connected to a source of pressured fluid, the fluid will enter the pulsating device through inlet 309 and continue to flow through passage 310 and port 311. Continuing on its path, the fluid will form and enter collection chamber 346 (see FIG. 4B) created between the outside surface 320 of insert 301 and inside surface 323 of elastic sleeve 302. The meeting of elastic sleeve 302 around barb 326 forms a normally closed inter chamber valve 338a. In the normally closed position, valve 338a prevents fluid from exiting collection chamber 346, such that fluid flowing into inlet 309 collects in collection chamber 346. As fluid collects, collection chamber 346 expands, for example, by stretching sleeve 302.

FIG. 4B illustrates embodiment 300 when inter chamber valve 338a narrowly opens. Fluid has collected in the expandable collection chamber 346 stretching elastic sleeve 302, and fluid continues to flow into the expandable chamber 346. By stretching sleeve 302 until inside diameter 324 of the elastic sleeve 302 becomes larger than outside diameter of barb 326, an annular space opens around barb 326 allowing fluid (such as water) to flow at a relatively low rate from collection chamber 346 to burst chamber 348. At this stage, outlet valve 338b is closed and fluid exiting collection chamber 346 accumulates in burst chamber 348.

In some embodiments, burst chamber 348 has a smaller capacity than collection chamber 346. Optionally, to accommodate a given fluid volume accumulation in burst chamber 348 sleeve 302 may stretch more than when accommodating the same volume in collection chamber 346. Extra stretching may result in a pressure rising at a higher rate relative to increased volume in burst chamber 348 than in collection chamber 346. As fluid moves from collection chamber 346 to burst chamber 348 pressure in burst chamber 348 rises faster than pressure is reduced in collection chamber. In some embodiments, increasing combined pressure from both chambers 346 and 348 on inter chamber valve 338a also causes valve 338a to widely open. As fluid accumulates in burst chamber 348 sleeve 302 expands around port 313, opening valve 338b and releasing fluid at a relatively high flow, in pulse cycle.

FIG. 4C illustrates embodiment where the inter chamber valve is widely open, the second valve opens, and fluid releases from the pulsating device. Fluid may optionally flow from collection chamber 346 through inter chamber valve 338a through burst chamber 348 through port 313 through fluid passage 315, and out through outlet 316. In some embodiments, the outlet path (including the second valve) is set up with very low (or no) resistance.

The length and/or volume of the collection chamber (for example section 305 FIG. 3) generally determines the volume of fluid that collects in and is ejected from the pulsating device of embodiment 300 during each pulse. When the pulsating device is used for operating micro-spinners, micro-jets misters, etc., the pulsating device only needs to collect and eject a relatively small volume of fluid in each cycle and therefore the collection section 305 can be relatively short. Alternatively, a relatively large volume collection section can be used for collecting and ejecting a relatively large volume of fluid in each pulsating cycle. For example, when the pulsating device is used for operating a pop-up sprayer, a pulsating drip line and/or a line of multiple emitters, the pulsating device may need to collect and eject a relatively larger volume of fluid in each pulsating cycle and therefore the collection section 305 may be longer.

Alternative Insert Structure

Figure 5A:
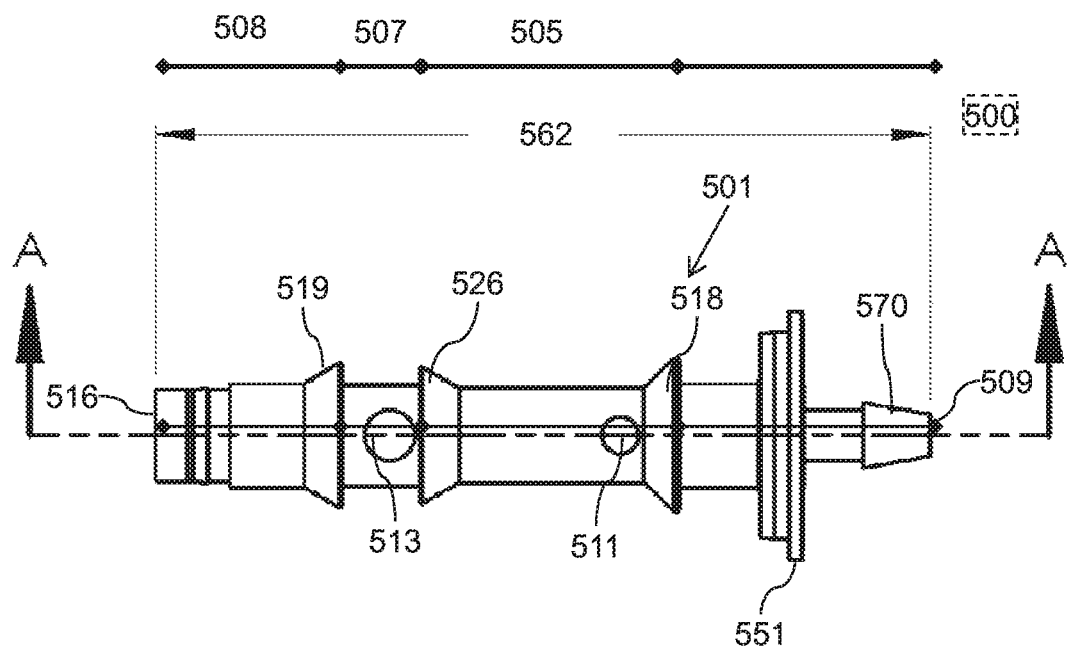
FIG. 5A-C illustrate a side view, a cross-section, and a perspective view of a pulsating device insert, in accordance with an embodiment of the present invention.
Figure 5B:
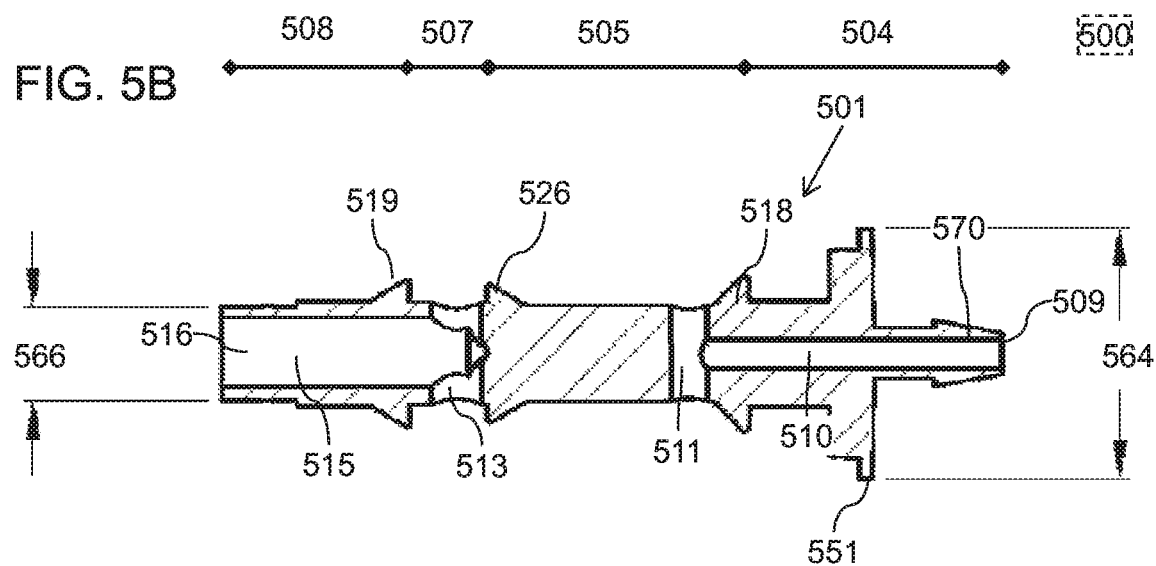
Figure 5C:
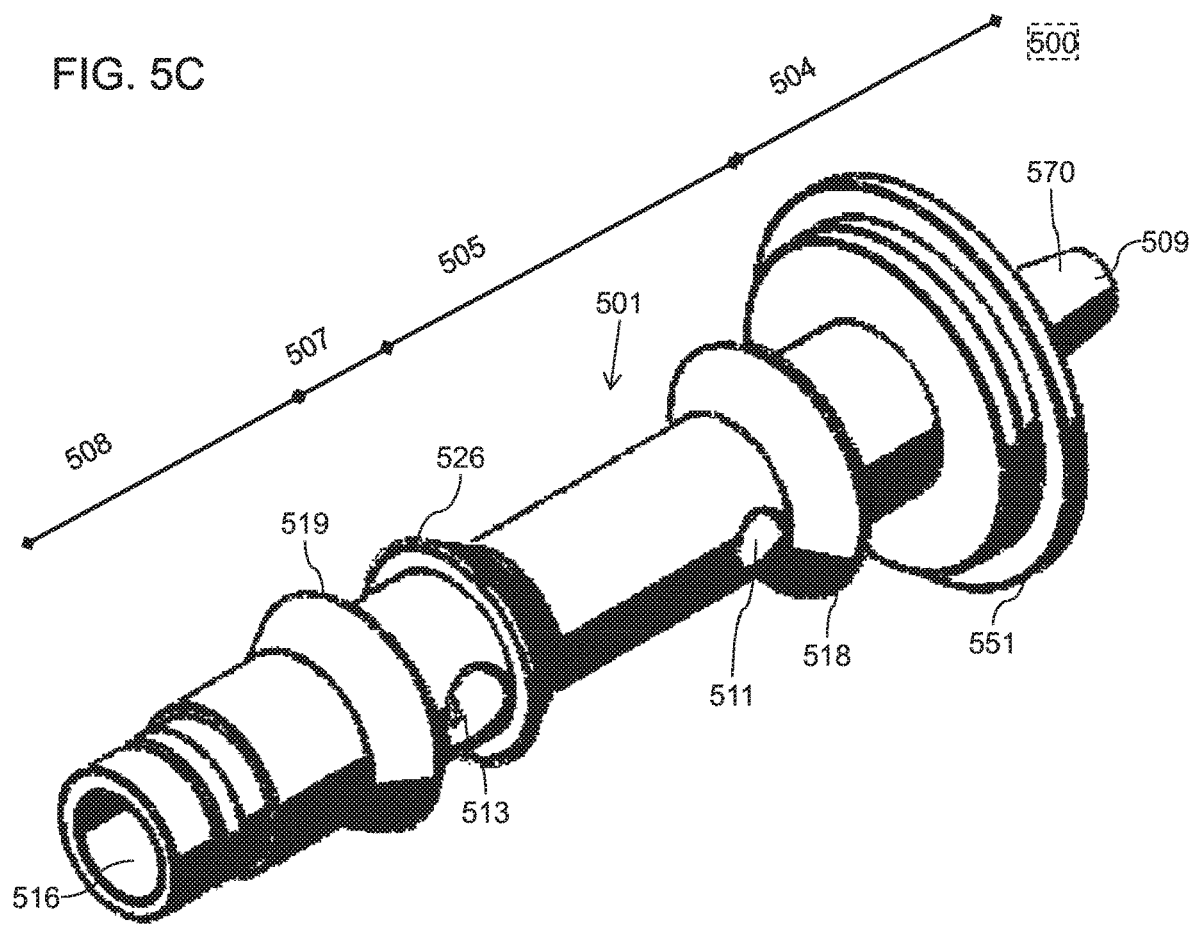

FIGS. 5A-C are drawings of a rigid insert 501 according to an embodiment of the present invention. FIG. 5A illustrates an orthogonal view of embodiment rigid insert 501. FIG. 5B illustrates a cross sectional view of rigid insert 501 along line A-A of FIG. 5A. FIG. 5C illustrates a perspective view of rigid insert 501. A pulsating device may be formed, for example, by inserting rigid insert 501 into an elastic sleeve (not shown in FIG. 5A, 5B or 5C, but may be in a manner similar to insert 301 in sleeve 302). An inner wall of the elastic sleeve may optionally be fixed and/or sealed against barbs 518 and/or 519 defining an end of a collection chamber and/or and end of a burst chamber respectively. An inner wall of the sleeve may optionally be biased to close over barb 526 forming an inter chamber valve. The inter chamber valve may for example define a boundary between a collection chamber in the inlet side up to the inter chamber valve and a burst chamber on the outlet side downstream from the inter chamber valve.

Rigid insert 501 may optionally be divided into several sections: for example, an inlet section 504, a collection chamber section 505, a burst chamber section 507, and/or an outlet section 508.

In some embodiments, inlet section 504 may include a fluid inlet 509 that is in fluid communication with a collection chamber (for example formed by an elastic sleeve around collection section 505). Communication between inlet 509 and the collection chamber may be, for example, via a passageway 510 and/or a port 511.

In some embodiments, outlet section 508 may include a fluid outlet 516 that is in fluid communication with a burst chamber (for example formed by an elastic sleeve around burst chamber section 507). Communication between outlet 516 and the burst chamber may be, for example, via a passageway 515 and/or a port 513. In some embodiments, outlet 516 and/or passageway 515 and/or port 513 may be configured to have low fluid resistance. In some embodiments, outlet 516 may be wider than inlet 509. For example, exit passageway 515 may be wider than inlet passageway 510. For example, outlet port 513 may be wider than inlet port 511.

In some embodiments, the elastic sleeve surrounding insert 501 and surround port 513 to form an outlet valve. When the elastic sleeve is wrapped around burst chamber section 507 the sleeve may stretch across port 513 closing it to flow. When fluid pressure is applied inside the sleeve, the pressure may expand the elastic sleeve away from port 513 opening the valve. In this embodiment, the outer diameter of the insert at the location of port 513 may be less than the inner diameter of the elastic sleeve in the unstressed position.

In some embodiments, the length of burst chamber (for example section 507) may be shorter than the length of collection chamber (for example section 505). For example, the length of collection chamber may be defined as the distance along insert 501 exposed to fluid stored in the collection chamber during the collection phase of the pulse cycle. For example in embodiment 500, the length of the collection chamber may be measured from a sleeve connection on the input side of the collection chamber (for example barb 518) to an inter chamber valve (formed, for example, over barb 526). For example, the length of burst chamber may be defined as the additional distance along rigid insert 501 exposed to fluid downstream from the inter chamber valve. For example in embodiment 500, the length of the burst chamber may be measured from a sleeve connection on the output side of the collection chamber (for example barb 519) to an inter chamber valve (formed for example over barb 526).

In some embodiments, the distance from the inter chamber valve to the outlet valve may be significantly shorter than the distance from the inter chamber valve to the inlet port. For example, in embodiment 500, the distance from the inter chamber valve to the outlet valve can be viewed as the distance from barb 526 to the center of port 513. For example, in embodiment 500 the distance from the inter chamber valve to the outlet valve can be viewed as the distance from barb 526 to the center of port 511. Alternatively or additionally, the location of the inlet port may be defined as the near end and/or far end of port 511. Alternatively or additionally, the location of the outlet valve may be defined as the near end and/or far end of port 513.

In some embodiments, an insert for a pulsating device may include a tubing connector (for example barb 570 for fitting to irrigation hose). In some embodiments, an insert for a pulsating device may include a fitting for a casing and/or fitting (for example fitting 551).

Pulsating Device System

Figure 6:
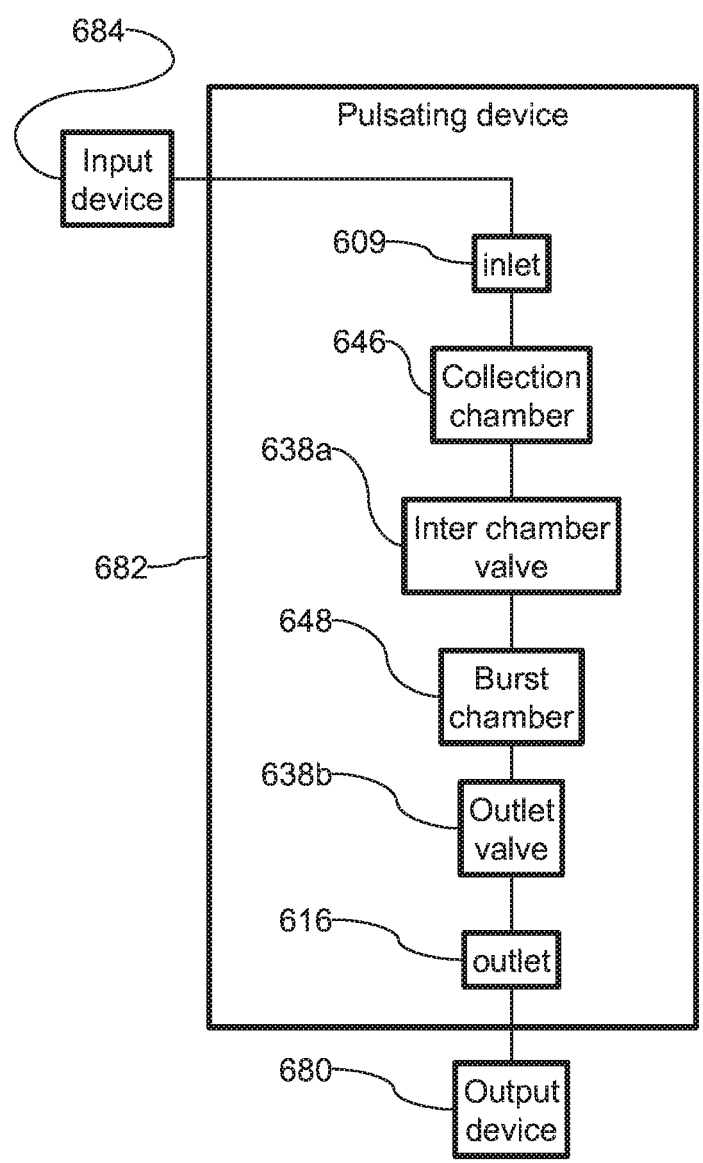
FIG. 6 is a block diagram illustrating a pulsating device system in accordance with an embodiment of the present invention.

FIG. 6 illustrates a pulsating device system in accordance with an embodiment of the present invention. The system may include an input device 684 supplying pressurized fluid to a pulsating device. The pulsating device 682 may include an inlet 609 in fluid communication with a collection chamber 646. Collection chamber 646 may be in intermittent fluid communication with a burst chamber 648. Fluid communication between collection chamber 646 and burst chamber 646 may optionally be controlled by an inter chamber valve 638a. Burst chamber 648 may be in intermittent fluid communication with an outlet 616. Fluid communication between burst chamber 648 and outlet 616 optionally may be controlled by an outlet valve 638b. Outlet 616 may be connected to an output device 680.

For example, an input device 684 may include a source of pressurized fluid in an irrigation system, which may be connected to the pulsating device via a dripper or flow control.

For example, output device 680 could include one of a variety of spraying or fluid-delivery devices, such as a sprinkler, micro sprinkler, micro-jet, agricultural dripper, pop-up sprinkler, micro-spinner, mister, fogger, anti-frost system or other irrigation devices.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A pulsating device comprising:
a rigid insert;
an elastic sleeve surrounding at least a portion of the rigid insert, wherein the elastic sleeve is configured to expand relative to the rigid insert;
an expandable collection chamber for receiving fluid from a fluid inlet, wherein the expandable collection chamber is disposed between the elastic sleeve and the rigid insert, along at least a first portion of the length of the rigid insert;
a burst chamber disposed between the elastic sleeve and the rigid insert, along at least a second portion of the length of the rigid insert which is downstream of the first portion of the length of the rigid insert;

a first valve for controlling a first fluid communication between the expandable collection chamber and the burst chamber; and a second valve for controlling a second fluid communication between the burst chamber and a fluid outlet;

wherein the first valve opens a first amount when a collection chamber pressure in the expandable collection chamber exceeds a first pressure value;

wherein the second valve produces a resistance, forcing the first valve to open an additional amount greater than the first amount;

wherein the second valve opens when a burst pressure at a location of the second valve exceeds a second pressure value;

wherein the second valve comprises a port in the rigid insert covered by the elastic sleeve when the second valve is closed; and wherein an outside surface of the rigid insert comprises an indentation disposed thereon between the fluid inlet and the first valve, and wherein the expandable collection chamber has a first volume defined between the indentation and an inside surface of the elastic sleeve when the elastic sleeve is in an unstressed state.

2. The pulsating device of claim 1, wherein the first valve comprises an annular protrusion on the rigid insert.

3. The pulsating device of claim 1, wherein the collection chamber pressure in the expandable collection chamber increases at a first rate in response to an increasing volume of fluid in the expandable collection chamber and the burst pressure in the burst chamber increases at a second rate in response to an increasing volume of fluid in the burst chamber, the second rate being greater than the first rate.

4. The pulsating device of claim 1, wherein the first pressure value is greater than the second pressure value.

5. The pulsating device of claim 1, wherein an inner diameter of the fluid inlet is less than an inner diameter of the fluid outlet.

6. The pulsating device of claim 1, wherein a length of the collection chamber is greater than a length of the burst chamber.

7. The pulsating device of claim 1, wherein the second valve is configured to close when the burst pressure at a location of the second valve is less than the second pressure value.

8. The pulsating device of claim 1, further comprising one or more output devices in fluid communication with the outlet, the output device is selected from the group consisting of a micro sprinkler, a micro-jet, an agricultural dripper, a pop-up sprinkler, a micro-spinner, a mister, a fogger, an anti-frost system, and any combination thereof.

9. The pulsating device of claim 1, wherein the expandable collection chamber has a second volume defined between the indentation and the inside surface of the elastic sleeve when the burst pressure at the location of the second valve exceeds the second pressure value, and wherein the second volume is greater than the first volume.

10. The pulsating device of claim 1, wherein the rigid insert comprises a plastic or polymer material.

11. The pulsating device of claim 1, wherein the rigid insert comprises ABS, polypropylene, or acetal.

12. A pulsating device comprising:
a rigid insert;
an elastic sleeve surrounding at least a portion of the rigid insert, wherein the elastic sleeve is configured to expand relative to the rigid insert;
an expandable collection chamber for receiving fluid from a fluid inlet, wherein the expandable collection chamber is disposed between the elastic sleeve and the rigid insert, along at least a first portion of the length of the rigid insert;

a burst chamber disposed between the elastic sleeve and the rigid insert, along at least a second portion of the length of the rigid insert which is downstream of the first portion of the length of the rigid insert;

a first valve for controlling a first fluid communication between the expandable collection chamber and the burst chamber; and a second valve for controlling a second fluid communication between the burst chamber and a fluid outlet;

wherein the first valve opens a first amount when a collection chamber pressure in the expandable collection chamber exceeds a first pressure value;

wherein the second valve produces a resistance, forcing the first valve to open an additional amount greater than the first amount;

wherein the second valve opens when a burst pressure at a location of the second valve exceeds a second pressure value;

wherein the second valve comprises a port in the rigid insert;

wherein an outside surface of the rigid insert comprises an indentation disposed thereon between the fluid inlet and the first valve, and wherein the expandable collection chamber has a first volume defined between the indentation and an inside surface of the elastic sleeve when the elastic sleeve is in an unstressed state; and wherein the expandable collection chamber has a second volume defined between the indentation and the inside surface of the elastic sleeve when the burst pressure at the location of the second valve exceeds the second pressure value, and wherein the second volume is greater than the first volume.

13. The pulsating device of claim 12, wherein the first valve comprises an annular protrusion on the rigid insert, and wherein the port in the second valve is covered by the elastic sleeve when the second valve is closed.

14. The pulsating device of claim 12, wherein the collection chamber pressure in the expandable collection chamber increases at a first rate in response to an increasing volume of fluid in the expandable collection chamber and the burst pressure in the burst chamber increases at a second rate in response to an increasing volume of fluid in the burst chamber, the second rate being greater than the first rate.

15. The pulsating device of claim 12, wherein the first pressure value is greater than the second pressure value.

16. The pulsating device of claim 12, wherein an inner diameter of the fluid inlet is less than an inner diameter of the fluid outlet, and wherein a length of the collection chamber is greater than a length of the burst chamber.

17. The pulsating device of claim 12, wherein the second valve is configured to close when the burst pressure at a location of the second valve is less than the second pressure value.

18. The pulsating device of claim 12, further comprising one or more output devices in fluid communication with the outlet, the output device is selected from the group consisting of a micro sprinkler, a micro-jet, an agricultural dripper, a pop-up sprinkler, a micro-spinner, a mister, a fogger, an anti-frost system, and any combination thereof.

19. The pulsating device of claim 12, wherein the rigid insert comprises a plastic or polymer material.

20. The pulsating device of claim 12, wherein the rigid insert comprises ABS, polypropylene, or acetal.

\* \* \* \* \*